United States Patent [19]

Lynch

[11] Patent Number: 4,595,440
[45] Date of Patent: Jun. 17, 1986

[54] TRANSFER PROCESS FOR FORMING MAGNETIC DISK MEMORIES

[75] Inventor: Gregory R. Lynch, Saratoga, Calif.

[73] Assignee: Memron Inc., San Jose, Calif.

[21] Appl. No.: 559,396

[22] Filed: Dec. 8, 1983

[51] Int. Cl.⁴ .............................................. B32B 31/24
[52] U.S. Cl. ..................................... 156/230; 156/232; 156/235; 156/242; 156/245; 156/246; 156/249; 156/272.2; 156/272.4; 427/47; 427/48; 427/128
[58] Field of Search ............... 156/230, 232, 242, 245, 156/246, 249, 272.2, 272.4, 234, 89, 231, 238; 427/47, 48, 128

[56] References Cited

U.S. PATENT DOCUMENTS

| | | | |
|---|---|---|---|
| 3,497,411 | 2/1970 | Chebinisk | 156/234 |
| 3,607,528 | 9/1971 | Gassaway | 156/230 |
| 3,793,066 | 2/1974 | Frenken et al. | 427/128 |
| 3,808,079 | 4/1974 | Arashi et al. | 156/230 |
| 3,932,253 | 1/1976 | Elarde et al. | 156/249 |
| 4,430,362 | 2/1984 | Melzer et al. | 427/48 |

Primary Examiner—Caleb Weston
Attorney, Agent, or Firm—Flehr, Hohbach, Test, Albritton & Herbert

[57] ABSTRACT

A unitized indirect gravure coating process for forming magnetic disks. Transfer pads coating techniques are applied to conventional magnetic coating materials to form high density, longitudinal, perpendicular or annual magnetic coatings for floppy or rigid disks.

30 Claims, 9 Drawing Figures

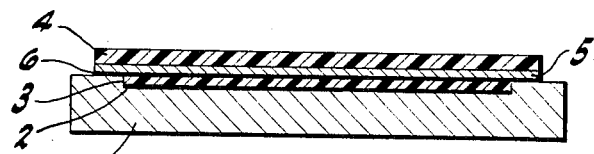

PRIOR ART
FIG-1

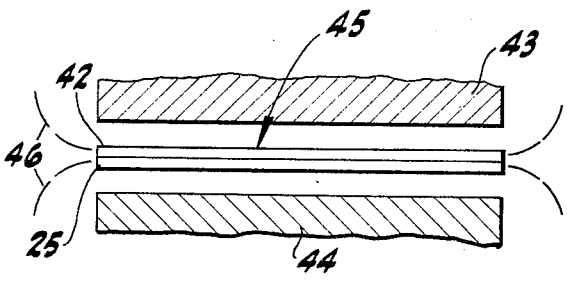

FIG-5

```
┌─────────────────┐
│ 1-FORMULA       │
│ PREPARATION     │
└────────┬────────┘
         │
┌────────┴────────┐
│ 2-COATING       │───┐
│ DEFINITION      │   │
└────────┬────────┘   ├─ PAD TRANSFER
         │            │   PROCESS
┌────────┴────────┐   │
│ 3-TRANSFER      │───┘
└────────┬────────┘
         │
┌────────┴────────┐
│ 4-ORIENTATION   │
└────────┬────────┘
         │
┌────────┴────────┐
│ 5-CURING        │
└────────┬────────┘
         │
┌────────┴────────┐
│ 6-DIE           │
│ CUTTING         │
└────────┬────────┘
         │
┌────────┴────────┐
│ 7-TESTING       │
│ &               │
│ PACKAGING       │
└─────────────────┘
```

FIG-2

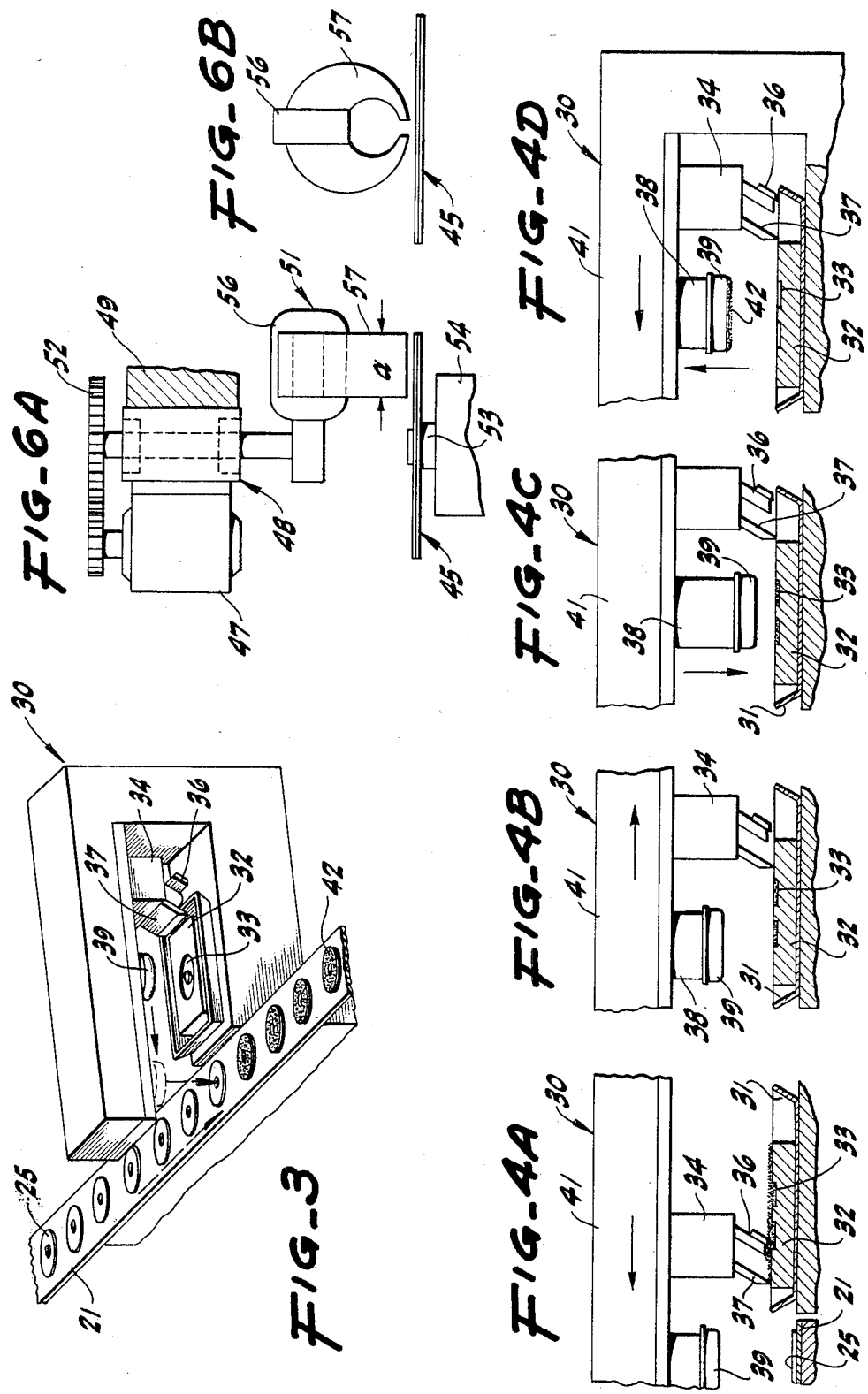

TRANSFER PROCESS FOR FORMING MAGNETIC DISK MEMORIES

BACKGROUND OF THE INVENTION

The present invention relates to a process for forming magnetic memories and, in particular, to a process for forming magnetic disk memories using coating transfer techniques.

Until recently, magnetic disk memories were usually fabricated using web coating or spin coating techniques to apply the magnetic coating to a supporting substrate. Probably the preferred present technique for making flexible or floppy disks involves application of a predetermined thickness of magnetic particulate dispersion onto a flexible substrate of polyethylene terephthalate (polyester) using a web coating process. Typically, the composite coating-substrate web is subjected to a magnetic field to eliminate magnetic orientation within the coating in the direction of the web. The moving coating is then cured prior to the coating-web composite being formed or cut into disks. To form rigid disks, the ferric oxide particulate dispersion is spin-coated to a predetermined thickness, typically onto an aluminum alloy disk, then is oriented by spinning in a magnetic field, and cured.

Only recently have coating transfer techniques been applied to magnetic memory fabrication, as one approach to provide the necessary production volume requirements in the face of the increasingly stringent, physical and magnetic constraints which are imposed as storage densities have been increased. Coating transfer technology has been used as a vehicle for incorporating electron beam-curing and other sophisticated types of apparatus into the process flow. In short (as evidenced by the articles discussed below), the emphasis has been on complicated processing techniques.

"Transfer Coating by Electron Initiated Polymerization", paper B-4 presented by Sam V. Nablo at the 1983 Symposium on Magnetic Medium Manufacturing Methods (SM-4) traces the development of continuous or transfer processes which use electron beam (EB) curing. The Nablo paper discusses the use of direct transfer processes to form magnetic coatings for rigid disks and floppy disks. (In considering the application of such processes to disks, it will be helpful to refer to the surface or side of the magnetic coating which is adhered to the disk as the "disk side" and that which faces the magnetic head as the "head side".) Nablo indicates that the magnetic coating for rigid disks can be formed on a temporary polyester carrier film which remains in place as a protective layer until testing. In this process, the disk side of the magnetic coating is contacted by and replicated off the transfer roll, while the head side is replicated off the temporary carrier film. The article suggests that this transfer process may provide high quality surface finishes without using very stringent aluminum disk surface finishing operations such as diamond turning and post-turning lapping, if optical grade polyester is used as the temporary carrier film.

The Nablo paper also suggests two possible approaches for applying EB-cured continuous transfer technology to flexible media: the magnetic coating can be formed onto the roll or the roll may serve merely as the surfacing support. Presumably in either approach electron beam exposure cures the magnetic coating next to the drum to perfectly replicate the drum surface in the magnetic coating.

The above paper's concern with achieving near-perfection in magnetic media surface finishes reflects just one of the increasingly stringent constraints, mentioned previously herein, which are imposed in attempting to increase magnetic information storage density. The object in increasing density is, of course, to provide more information storage capacity on a disk (or a tape) of a particular size or to reduce disk size while retaining or increasing storage capacity. It is probably an industry concensus that the bit densities of longitudinally oriented systems can be increased beyond the present values of 8000-9000 bits/inch only if (1) the magnetic media thickness and the head-to-media interface (which is limited by the surface finish of the magnetic media) can be scaled to very small values and if (2) the problem of demagnetizing fields is successfully overcome. The head-to-media interface and magnetic quality are primary constraints which lead to the need for surface perfection. Unfortunately, the present longitudinal technology may be at its limits. It may not be possible to achieve more extreme scaling and greater surface perfection without the development of new materials and technology.

In contrast to longitudinal systems, perpendicular systems have density characteristics which are essentially independent of media thickness. Perpendicular systems thus do not require the extreme scaling of longitudinal systems. In addition, perpendicular magnetization is not subject to the demagnetizing fields which are present in longitudinal systems. However, the development of commercial perpendicular systems is constrained by the lack of materials which possess suitable characteristics.

Perhaps the only previously known process which uses conventional oxide particulate dispersions, yet is alleged to be suitable for high quality, high density, perpendicularly-oriented magnetic disks is the unitized transfer process disclosed in "Perpendicularly Oriented Pigmented Media", paper MMS-C, presented by Dennis E. Speliotis and Lawrence B. Lueck at the above mentioned SM-4 Symposium. Like Nablo, Speliotis et al use both transfer and EB-curing techniques. However, Speliotis et al believe that an uncured web system (which Nablo uses) may experience orientation distortion which makes it unacceptable for application to tape systems. Thus, their system was developed for unitized production and is reported to be suitable for producing both floppy and rigid disks.

Referring now to FIG. 1, the relatively complicated laminating structure used by Speliotis et al comprises in order a highly lapped transparent casting receptor 1 having a surface finish of about 0.4 microinches, a thin fluorocarbon release lubricant layer 2, and a wet magnetic dispersion coating 3 which consists of a high solids dispersion of chromium dioxide pigment in resin binders and solvents. The binders are chosen to have a large viscosity-temperature gradient. The dry coating is maintained at an elevated temperature of perhaps 60°-70° C. during processing to provide mobility for the magnetic pigment in the 100 percent solids dispersion. The coating 3 is oriented perpendicularly by exposure to a magnetic field from beneath the receptor 1. This assures maximum surface magnetization at the receptor-coating interface, that is, the head side of the coating. Next, the composite comprising polyester substrate 4, permalloy layer 5, and EB-curable resin laminating layer 6 is mechanically attached to the receptor-coating composite. This assembly is exposed to electron beam radiation from below to cure the laminating layer 6 and thereby laminate the assembly. The assembly is then delaminated from the receptor. The authors attribute to this process and structure the advantages of perpendicular orientation, replication of the receptor surface perfection in the head side of the magnetic coating, and avoidance of the so-called Manhattan vista effect in the magnetic particle profile.

At this point, it should be apparent that the application of coating transfer technology to the production of magnetic memory media is characterized by the use of sophisticated expensive equipment, such as electron beam generating apparatus, and by relatively complicated processes and media structures. To the knowledge of this inventor, to date no one else has developed a simple coating transfer process which provides excellent thickness uniformity and range and quality and which is also suitable for use in high volume commercial production. Indeed, the trend seems to be the opposite, toward increasingly complicated vacuum deposition, electron beam and other sophisticated processes.

SUMMARY OF THE INVENTION

In view of the above-described state-of-the-art, it is a primary object of the present invention to implement a transfer coating process for forming magnetic disk memories in a procedure which is straightforward, yet very versatile, and which is adaptable to large volume commercial production.

It is another object of the invention to form magnetic disk memories using an indirect gravure transfer process.

It is another object of the present invention to provide a process for fabricating very thin magnetic media.

It is another object of the present invention to provide a fabrication process for magnetic disk memories which provides excellent control of the magnetic coating thickness.

It is another object of the present invention to provide a fabrication process for magnetic disk memories which provides an excellent surface finish.

It is another object of the present invention to implement a fabrication process for magnetic disk memories using a coating transfer procedure which is suitable for providing annular, perpendicular and longitudinal magnetic orientation in the magnetic media.

These and other objects of the invention are provided in a process which is an improved unitized transfer process. Unlike the Speliotis et al process or any other known magnetic coating process, the present invention utilizes a pad coating transfer process which is a modification of ink transfer processes and which provides excellent control of the magnetic and physical characteristics of the magnetic disk memory. At the same time, my process is relatively simple and straightforward in its implementation.

In a presently preferred embodiment for forming a magnetic recording coating on a supportive substrate, my process comprises forming a magnetic dispersion; depositing and forming the dispersion using a mold having a predetermined nominal depth; using a deformable, compliant transfer media of material such as silicone, transferring the magnetic pigment dispersion layer from the mold to the supporting substrate; and, in a predetermined sequence, orienting the magnetic pigment particles and curing the dispersion to laminate the coating to the substrate and to maintain the magnetic orientation of the particles.

Possible magnetic orientations include perpendicular orientation, that is, orientation perpendicular to the plane of the disk, annular or circumferential orientation, and longitudinal orientation.

BRIEF DESCRIPTION OF THE DRAWINGS

FIG. 1 is a cross-sectional view of the laminated transfer structure used by Speliotis et al;

FIG. 2 is a block diagram illustrating the primary steps of a preferred embodiment of the present invention;

FIG. 3 illustrates one arrangement of apparatus for implementing the coating definition and transfer steps of the present invention;

FIGS. 4A through 4D illustrate the sequential use of the apparatus of FIG. 3 in implementing the coating definition and transfer steps of the present invention;

FIG. 5 illustrates apparatus for imparting perpendicular magnetic orientation in accordance with the process of the present invention; and FIG. 6 illustrates apparatus for imparting annular magnetic orientation in accordance with the process of the present invention.

DETAILED DESCRIPTION OF THE INVENTION

FIG. 2 outlines the steps of a complete magnetic disk fabrication process which embodies the present invention. Step (1) of the process involves preparing a magnetic coating, such as a magnetic oxide pigment dispersion. A magnetic pigment, such as gamma ferric oxide ($Fe_2O_3$), barium ferrite, iron and iron alloy metal particles, cobalt-modified iron oxides, or chromium oxide is dispersed to a suitable viscosity and rheology with conventional resins, solvents, dispersants, catalysts and curing agents. Then, (2), a quantity of the magnetic dispersion is formed to a desired thickness and configuration in a mold. In step (3), pad transfer techniques are used to lift the coating from the mold and transfer the coating intact to a substrate such as a polyester resin flexible backing used for floppy disks, or a rigid aluminum alloy backing used for rigid disks. In step (4), the "wet" uncured coating is oriented in a static or dynamic magnetic field. The coating is dried or cured in step (5). Depending on the dispersion formulation, this fifth step can be a simple air drying or hot air drying step or can involve electron beam or ultraviolet curing. Next, (6), alignment apertures, etc. are formed in the die/disk and, (7), the cured, formed disk is subjected to conventional test procedures and is appropriately packaged. For example, for floppy disks, packaging involves the combination with a liner and a plastic jacket.

The above fabrication process has several distinct advantages which will become apparent to those skilled in the art. One advantage is versatility. That is, the process is believed applicable to essentially any formulation which is used for preparing magnetic media. Also, the discrete magnetic coating is physically formed and shaped early in the processing sequence. This gives very wide latitude and presents numerous options for carrying out the later steps. Secondly, this unitized process is free of the constraints involved, for example, in coating and orienting a continuous, presumably moving web of material or in coating a spinning disk. Nonetheless, the other advantages (such as thickness, discussed below) are such that the process can be applied beneficially to coat a substrate web. Third, the molding and transfer process together constitute a pad coating transfer process which is relatively easy to implement, yet provides coatings which have very precisely controlled thickness. The indirect gravure process disclosed herein can provide coating thicknesses down to approximately 10 microinches. Fourth, the magnetic orientation can be done in a variety of ways. For example, the magnetic field source can be tailored to the configuration of the molded media and can be applied dynamically or statically to give longitudinal or perpendicular orientation. By spinning the disk in a longitudinal field, the magnetic orientation can be made annular or circumferential, that is, longitudinal but oriented circumferentially rather than linearly. Also, the curing and orienting steps can be combined into a single operation.

Because the coating and transfer steps are crucial aspects of the present invention which are affected by the formula preparation and, in turn, determine the orientation and curing steps, these five steps are discussed in some detail below. The die-cutting, testing and packaging sequences are conventional steps which are essentially unaffected by the present invention and need no further explanation for those skilled in the art.

I. FORMULA PREPARATION

As mentioned previously, the present process is adaptable to a wide range of formulations for preparing flexible magnetic media. These include the polyurethane resin based systems which are in general use today for flexible disk coatings. Such systems are classified as solvent coatings and can be dried and cured using relatively simple hot air dryers. The process, however, is also adaptable to other systems such as those which are formulated for ultraviolet (UV) and electron beam (EB) curing. Although the UV-curable and EB-curable systems are more complex and more expensive than the typical hot air drying system, they have the advantage of short curing cycles.

By way of example, Table I defines two polyurethane resin solvent systems designated "A" and "B". Table II provides a media formulation for an EB-curable system. Such formulas can be prepared for coating, in step (2), by essentially any of the many existing methods. For example, the polyurethane resins can be first dissolved in the solvent using high shear mixers, then the oxide, carbon black dispersants and other additives are mixed into the resin solution. The mixture can be dispersed, for example, in a ball mill (a rotating chamber containing steel or ceramic balls approximately 1/18 to ⅛ inch in diameter); or in a bead mill (a milling chamber in which the sample mixture is pumped through a chamber filled with grinding beads).

TABLE I

| Constituent | | FORMULAS Supplier | | PARTS/100 | |
|---|---|---|---|---|---|
| Type | Name | Designation | Supplier | A | B |
| Pigment | Iron Oxide | HR280 | Hercules | 23.9 | 25.2 |
| Dispersant | Soya | Centrolex P | Central Soya | 0.7 | 0.7 |
| Hardener | Alumina | E440 | Norton Co. | 0.4 | 0.4 |
| | Carbon Black | XC72R | Cabot Corp. | 1.0 | 1.0 |
| Resin | Urethane Resin | 310 | Morton | 8.0 | 8.4 |
| Solvent | Cyclohexa- | — | DuPont | 49.0 | 49.6 |

TABLE I-continued

| Constituent | | FORMULAS Supplier | | PARTS/100 | |
|---|---|---|---|---|---|
| Type | Name | Designation | Supplier | A | B |
| Solvent | none THF (tetrohydrofuran) | — | DuPont | 16.3 | — |
| Solvent | MEK (methylethylketone) | — | | | 13.8 |
| Lubricant | Butoxyethyl Stearate | — | Stephan Chemical | 0.7 | 0.75 |

Note:
Catalysts and crosslinkers for the urethane resin were intentionally omitted from the above experimental formulations to avoid processing problems due to shortened pot life.

TABLE II

Magnetic Oxide Dispersion Using RD4191-74 Electron Beam Curable Polyurethane

| | Material | Parts by Weight |
|---|---|---|
| Mill Base: | Magnetic Iron Oxide | 34.09 |
| | RD2195-65 (30% in THF) | 4.42 |
| | Dispersant | 1.02 |
| | Wetting Agent | 0.61 |
| | Lubricant | 0.14 |
| | THF | 9.63 |
| | 74.5 weight percent Non-volatiles; 68.3 weight percent Iron Oxide; | |
| Letdown: | Mill Base | 49.91 |
| | RD4191-74 (72% in THF) | 13.84 |
| | THF | 36.25 |

Dispersion techniques are well-known in the art and need not be discussed further herein. After dispersion, additional solvents and resin are added to provide the optimum coating viscosity and solids concentration. Catalytic and curing agents are added at this time also.

II. COATING DEFINITION

III. TRANSFER

Although the coating definition and transfer sequences are distinct operations, they are readily adapted to a combined processing sequence. In fact, pad inking transfer apparatus is available which can be used for the combined sequence. Pad transfer machines of the type illustrated in near-schematic form in FIGS. 3 and 4 are available from several manufacturers. They are available in a range of sizes through Tampoprint America, Inc., 655 West Wise Road, Schaumburg, Ill. For convenience and to reflect the most commercially feasible approach used in reduction to practice, the coating definition and transfer steps will be discussed as part of a continuous manufacturing sequence using the Tampoprint Model TS200-21.

Referring to FIG. 3, an exemplary sequence involves preparing the "wet" magnetic media dispersion to a circular (or other) configuration 42, then transferring the coating 42 via transfer pad 39 to a disk substrate 25 on a conveyor 21 which is indexed past pad transfer apparatus 30.

Referring now to FIG. 4 and in particular to 4A, the pad transfer printing apparatus 30 comprises a tray 31 for holding a cliche 32. The cliche is, e.g., a steel plate which has an image or mold 33 formed in the upper surface thereof. Two arm assemblies 34 and 38 depend from horizontal support arm or platform 41 and are mounted thereon for reciprocal translational movement as indicated by the arrows. Arm 34 carries a dispensing tube or spatula 36 which is connected to a supply of the pigment dispersion (not shown) for automatic dispensing. Arm 34 also mounts a doctor blade 37. Silicone transfer pad 39 is attached to the bottom of the second arm 38.

During coating definition, and starting with the arms 34 and 38 positioned to the right, the arms are moved leftwardly as shown in FIG. 4A. During this movement, a uniform layer of a predetermined quantity of dispersion material is automatically dispensed by the spatula 36 as it traverses the mold 33 just above the cliche upper surface.

Arms 34 and 38 are then returned to the right as shown in FIG. 4B. During the return, the doctor blade 37 scrapes excess coating from the cliche, leaving a coating 42 which is precisely defined within image/mold 33 to a predetermined nominal thickness and configuration. Unlike web processing techniques, which depend upon the spacing of a doctor blade from a moving web or upon the nip formed by a drum or roller, and unlike spin coating processes, which depend upon centrifugal force and viscosity, my process has the advantage of forming the coating 42 to a precise thickness of very small dimension. The thickness of coating 42 is determined by that of mold 33. The mold thickness is formed prior to the coating process, and thus is not subject to variations caused by the coating process itself. The thickness can be very precisely controlled to very small dimensions by techniques such as etching or photo-engraving, by electro-discharge machining, or by burnishing or surface grinding, with or without chrome plating. A typical etching process involves forming a patterned mask on the surface of the cliche 32, then chemically etching the pattern in the cliche. Etching is advantageous, because by using a relatively slow chemical etchant and by monitoring the etch time, very thin, precisely controlled coatings 42 can be formed.

To transfer the coating 42, arm 38 is lowered, as shown in FIG. 4C, to bring the transfer pad 39 into contact with the coating 42 and pick up the coating. As mentioned, silicone is a preferred transfer pad material. Silicone is soft and flexible and has excellent release qualities such that the coatings can be transferred numerous times without cleaning the pad.

Continuing now with the transfer process, the arm 38 is raised and moved to the left as shown in FIG. 4D, positioning the pad 39 directly over a substrate 25 (FIG. 3) then the arm 38 is again lowered to deposit the coating 42 onto the substrate 25. The apparatus 30 then returns arms 34 and 38 to their original position preparatory to the start of another coating definition and transfer sequence. Concurrently the conveyor belt 21 is indexed to position the next substrate 25 for a coating transfer step.

IV. ORIENTATION

After coating the formed magnetic formula 42 on the substrate 25, and while the formula is still in the liquid state, the magnetic particles therein can be moved about and positioned in the desired final orientation. Present technology usually uses a longitudinal orientation in which the long particle axes are predominantly oriented parallel to the plane of the substrate disk or tape. However, perpendicular orientation is being used increasingly, as mentioned previously. For either orientation, digital zero/one bit information can be imparted to the oriented particles by using the magnetic field of a disk drive unit to orient the north/south magnetic dipole in one of two anti-parallel orientations along the recorded track.

It is one of the primary advantages of the present invention that essentially any known orientation technique can be applied to the discrete disks. For example, and as shown in FIG. 5, a disk 45 is positioned between the poles 43 and 44 of a magnetic field source such as an electromagnet or permanent magnets can apply a magnetic field 46—46 to a static, non-moving disk 45. The source can be configured to accommodate the shape of the disk, thus avoiding problems such as fringing fields. In short, the shape and strength of the field generated by permanent and electrode magnets can be tailored to the particular size and shape of the magnetic media without the limitations imposed by a continuous moving web. Also, unlike other processes, orientation of one or more disks can be selectively checked and any necessary process adjustments made prior to orienting other, subsequent disks. Furthermore, the unitized orientation process is also adaptable to high volume commercial fabrication techniques. For example, the orientation apparatus can be situated as one station along the conveyor 21 of FIG. 3. Orientation can be performed on one or more disks while the conveyor 21 is stationary during a pad transfer operation.

As a second orientation example, FIG. 6 illustrates apparatus for providing annular magnetic orientation in disk 45. The orientation apparatus includes a variable speed DC motor 47 and bearing housing and spindle housing drive 48 which are supported at 49. A magnet assembly 51 is attached to the spindle. As shown more clearly in FIG. 6B, the magnet assembly 51 comprises north and south pole pieces 57—57 and coil 56. The disk 45 is mounted by supports 53 and 54 in a stationary position adjacent the pole pieces 57—57. The spindle and the magnet assembly 51 are rotated by motor 47 through gear drive 52 radially about the disk 45. Preferably, the width "a" of the pole pieces is approximately equal the radial dimension of the recording area of the disk. Rotation of the magnet assembly 51 annularly about the disk surface produces horizontal magnetic orientation along concentric tracks in the magnetic media. To illustrate only one possible choice of parameters, the rotational speed of the disk can be 10–30 rpm, and a DC power supply rated at 200 watts maximum can be applied through coil 56 of approximately 300 turns of 0.060 inch diameter copper wire to provide a magnetic field which is variable within the range 100 to 4,000 gauss. As will be appreciated by those skilled in the art, the angular velocities used in the above-described spin orienting step are low. Thus, one need not be concerned about the effects of speed or of the coating viscosity. In other words, the orienting speed is so slow as to have virtually no effect on the coating thickness, regardless of the viscosity thereof and, as a result, the orientation procedure can be tailored to optimize magnetic orientation without physically affecting the coating.

The above-described process versatility is in contrast to the prior art web coating and spin coating processes used for flexible and rigid disks. In conventional moving-web coating processes, the web can tend to orient the magnetic particles in the direction of the web. Magnetic "orienting" apparatus ("disorienting" might be more accurate) typically is positioned along the web subsequent to the coating or applicator station and is used to eliminate the undesirable orientation in the web direction and the modulation problems caused thereby.

The ways to control orientation are constrained by machine speed, magnet strength and position and the drying rate of the formula. For example, sometimes it is necessary to slow the web movement to get the proper control. In fact, it is difficult to impart a preferred orientation at all, because the logistics of orienting a moving web are very difficult and because it is too late to orient once the web is formed into discrete disks, for this implies prior curing.

In spin coating, the coating material is metered onto a substrate which is spinning at high speed. After the coating is applied, the spinning substrate passes through a magnetic orientation field. The thickness of the coating is controlled by the spinning speed and is very sensitive to viscosity. This technique is tailored to speed and viscosity constraints at the expense of magnetic orientation.

V. CURING

As mentioned previously, curing can be done by air drying or hot air drying of the solvent coatings listed in Table I, by electron beam curing of the EB-curable polyurethane dispersion listed in Table II, or by UV-curing of appropriate formulations.

Like the orientation step, the drying/curing operation is readily adaptable to high volume commercial processing installations such as that shown in FIG. 3. The drying or curing apparatus can be applied at a dedicated station along the conveyor belt 21. In addition, drying/curing can be combined with orientation to facilitate permanent orientation of the particles. In contrast to processes such as the above-described Speliotis et al process which perform the curing step in the mold, in the present process curing is done as the last major coating formulation step. The advantages include orienting the formed disk free of the constraints imposed by the presence of the mold.

A working example of the use of the present process to form a magnetic floppy disk is as follows.

EXAMPLE

FORMULATION

The following ingredients (formula A, Table I) were added to a 3 liter ball mill which previously had been loaded to 50% volume with ¼" diameter steel balls:

| Component | Grams |
|---|---|
| Hercules, HR280 iron oxide | 900 |
| Central Soya, Centrolex P soya | 25.2 |
| Norton Co., E440 alumina | 15 |
| Cabot Corp., XC72R carbon black | 36 |
| Morton, CA-310 urethane resin | 300 |
| DuPont, cyclohexanone | 1845 |
| DuPont, THF (tetrahydrofuran) | 615 |
| Stefan Chemical, butoxy ethyl stearate | 27 |

The mill was rotated for 20 hours at 20 rpm. During rotation the mill slurry was maintained at 80° F. by adjustment of cooling water flow to the jacket. At the end of the rotation cycle the mill was drained through an 80 mesh screen to separate the resulting slurry from the steel balls. The slurry was filtered through a fine, approximately three-micron, cloth filter and stored in gallon cans. The paint cans were continuously rolled on a roller mill to maintain the dispersion.

At the time of use the slurry had a viscosity of 1950 centipoise as measured with a Brookfield viscometer using spindle #3 at 20 RPM.

MOLD PREPARATION

An artwork image of the recording area of a 5.25" flexible disk was prepared. Photographic negatives were prepared from this artwork. An etched plate was then prepared by conventional techniques using the photographic negatives and an etchant such as a ferric chloride solution. The length of time the plate is held in the etching bath determines the depth of the etch. In this case, the etching time was chosen to provide a depth of 30 microns (approx. 1200 microinches). The resulting etched annular pattern had these dimensions: 1.5 inches inside diameter, 5.20 inches outside diameter and 30 microns depth.

COATING

A Tampoprint TS200/21 machine was used for coating. A mechanical fixture was prepared so that a 7-inch wide roll of polyethylene terephthalate substrate film could be conveniently pulled through the printing station of the pad transfer machine. The etched plate prepared above was installed in the machine and the formula prepared above was added to the machine reservoir. The machine conditions were checked by printing on ordinary paper. Machine speed was then evaluated. For example, speed was varied from five print cycles per min. to twenty-five print cycles per min. The polyester web was pulled through by hand. The resulting coated material was air dried. After visually evaluating the results, it was determined that a speed of about twenty-two print cycles per min. provided the best, most uniform results. Accordingly, the speed was used to prepare 100 flexible disks. The finished disks were die cut from the web and burnished using conventional equipment. Orientation was not attempted.

TESTING

Thickness—Magnetic film thickness was very uniform from disk to disk and averaged 71 microinches, with a range of 65 to 75 microinches.

In addition to the 71 microinch films, flexible magnetic films were also prepared and coated as described above but using a different plate which was etched to a thickness of 700 microinches. This plate provided films/coatings which averaged 45 microinches in thickness. Again, the film thickness was uniform and quality, as evidenced by visual inspection, was good. However, magnetic quality was not tested.

TEST RESULTS

Magnetic Properties—Magnetic orientation was not attempted, because the primary purpose was to establish the capability to uniformly transfer magnetic iron oxide coatings using the pad transfer process. The magnetic properties shown in the following tabulation are averages for the 100-sample lot and are compared to a reference disk, which was No. DRP 745, obtained from 3M Co.

| Property | Reference Disk (3M DRP 745) | Samples 0° | 90° |
|---|---|---|---|
| Thickness (μ-inches) | 95 | 70 | 71 |
| Output (mv) | 8.5 | 8.0 | — |
| Modulation | 103% | 100% | — |
| Coercive Force, $H_C$ (Oersteds) | 301 | 267 | 264 |
| Remanent flux, $\phi_R$ (Maxwells) | 4.44 | 3.65 | 3.80 |
| Magnetization flux, $\phi_M$ (Maxwells) | 7.377 | 5.76 | 6.24 |
| Squareness (ratio $\phi_R$ to $\phi_M$) | 0.6 | 0.63 | 0.61 |

| Property | Reference Disk (3M DRP 745) | Samples 0° | 90° |
|---|---|---|---|
| Switching Field | 0.78 | 0.82 | 0.85 |

The above EXAMPLE utilized relatively crude, unrefined processing techniques. For example, the formulation was not optimized for dispersion, coating, or magnetic quality. Magnetic orientation was not attempted. Clean room conditions were not used, despite the propensity of the silicone transfer pad to gather dust and other contaminants from the ambient. Despite these shortcomings, thin flexible magnetic films were consistently and readily formed and applied to the flexible substrate material. In the main, the magnetic quality was comparable to that of the reference disk, which presumably, was produced using an optimized process and formulation. Any differences are attributable to the unrefined processing technique. The average film thickness of 71 microinches can be readily reduced by defining a shallow profile in the plate, either by etching (as evidenced by the 45 microinch thickness obtained using the 700 microinch plate) or burnishing or by other conventional techniques. In this regard, it should be noted that the nominal thickness of the etched plate pattern was not transferred in a one-to-one ratio to the coating. In fact, the measured coating thickness of 45 and 71 microinches was approximately 1/16 and 1/17, respectively, the pattern thickness. This is beneficial in producing thin films, for conservatively speaking, it shows that the described process can be used to provide a magnetic coating thickness which is, e.g., one-tenth to one-twentieth that of the mold. This means that the approximately 100 microinch minimum thickness mold depth available using conventional techniques will produce coating thicknesses of approximately 10 microinches. In addition, one can insert a screen in the mold to control the volume of material in the mold and, therefore, further decrease the resulting coating thickness. As an example, an eighty line screen in the 700 microinch mold provided coatings approximately 10-20 microinches thick. Alternatively, of course, the coating thickness can be increased very substantially above the approximately 10-70 microinches average sample thickness, to several thousand microinches and greater, for the upper thickness limit is constrained not by the ability to define patterns, but only by the inherent capability of the pad transfer process to transfer increasingly thick and therefore heavy coatings intact.

The coating thicknesses of approximately 10 microinches which are attainable using the present indirect gravure or pad transfer process are a primary advantage of the present invention. Considering as an example floppy disks, currently these consist of a magnetic coating approximately 90-100 microinches thick on a 3,000 microinches thick polyester film substrate. The newer micro disks being developed have thicknesses in the range of perhaps 50-60 microinches. Higher density recording and vertical recording will require thinner coatings. Rigid disks require coatings of perhaps 10-20 microinches. Despite the requirements for increasingly thin magnetic coatings, the current technology is struggling at perhaps 70-90 microinches.

Various advantages of the process have been described above, both from the standpoint of processing and in terms of the product characteristics. Several advantages were summarized just prior to the detailed discussion of formula preparation. Several additional advantages will be briefly summarized here. The first such additional advantage relates to the fact that the unitized process is free of the shape and movement constraints imposed by web techniques and is free of the speed and viscosity constraints of spin coating techniques. Essentially any known orientation approach can be used and the shape of the orienting field can be precisely tailored to the static magnetic media. Second, the influence of the substrate on the coating is eliminated because of the nature of the transfer process. Instead, the coating takes on the near surface perfection of the precisely finished mold 33. Third, the process can be run with any substrate such as standard 5086 aluminum alloys, molded plastic or polyester films. Fourth, the coatings can be pattern molded, for example, to have individual tracks formed therein by defining the tracks in the mold. Fifth, very precise thickness control as well as very thin coatings are available. Also, the thickness of an individual coating can be varied. For example, the thickness can be varied uniformly or stepped from a relatively large dimension at the periphery of the mold to a thinner dimension at the center of the mold to accommodate the higher head-to-disk speed in moving from the center towards the periphery of the disk. Sixth, plural layer or multiple layer coatings of different magnetic (or other) characteristics are readily formed by sequentially forming the layers, one on top of another. As a seventh advantage and further regarding tracks, using a film thickness of 30-40 microinches will permit track densities of approximately 300-400/inch. Conventional floppy disks have only 96/inch. Eighth, the unitized approach does not waste expensive coating media and substrate media. Ninth, the equipment necessary to implement the process is for the most part conventional, relatively simple and inexpensive. The primary capital cost would likely be in the coating definition and pad transfer apparatus 30; other apparatus would be relatively inexpensive unless one chose to use EB-curing or UV-curing stations.

Having thus described a preferred embodiment and numerous alternatives and advantages of the present invention, what is claimed is:

1. A process for forming a magnetic coating on a supporting substrate comprising depositing a liquid dispersion of magnetic material in a mold having a nominal depth and an upper surface, passing a blade along the upper surface to remove excess liquid and precisely define the coating thickness and configuration and, using a compliant transfer media, picking up the formed liquid dispersion of magnetic material from the mold and transferring the liquid dispersion to the supporting substrate to form a magnetic coating thereon, then drying the coating.

2. The process of claim 1 wherein the liquid dispersion of magnetic material is a dispersion of magnetic pigment and includes polyurethane resin.

3. The process of claim 2 wherein the magnetic pigment is gamma ferric oxide.

4. The process of claim 2 wherein the magnetic material is first mixed in suitable solvents and then dispersed preparatory to depositing in the mold.

5. The process of claim 1, wherein the step of drying the magnetic coating on the supporting substrate is done at substantially room temperature.

6. A process for forming an oriented magnetic coating on a supporting substrate, comprising:

forming a magnetic particle dispersion;

depositing the dispersion into a mold having a predetermined configuration and nominal depth;

using a discrete, compliant transfer media, picking up the formed magnetic particle dispersion from the mold and transferring the dispersion to the supporting substrate to form a magnetic coating thereon; and in a predetermined sequence, orienting the magnetic particles of the coating to a preferred magnetic alignment by applying a magnetic field thereto, and curing the coating to adhere the coating to the substrate and maintain the particle magnetic orientation.

7. The process of claim 6 wherein the magnetic material is a dispersion of magnetic pigment and includes polyurethane resin.

8. The process of claim 7 wherein the magnetic pigment is gamma ferric oxide.

9. The process of claim 7 wherein the magnetic material is first mixed in suitable solvents and then dispersed preparatory to depositing in the mold.

10. A process for forming a flexible magnetic disk composite of magnetic oxide coating on a supporting substrate, comprising:

providing a mold having an etched surface pattern of predetermined nominal depth;

depositing a magnetic oxide coating material in the pattern;

removing the excess material from the mold surface to define the coating within the pattern;

contacting the coating with a discrete transfer medium to temporarily adhere the defined coating to the medium;

transferring the coating from the medium to the substrate;

establishing a preferred magnetic orientation in the coating; and curing the coating.

11. The process of claims 1, 6 or 10 wherein the compliant transfer medium is silicone.

12. The process of claim 10 wherein the magnetic material is a dispersion of magnetic pigment and includes polyurethane resin.

13. The process of claim 12 wherein the magnetic pigment is gamma ferric oxide.

14. The process of claim 12 wherein the magnetic material is first dissolved in suitable solvents and then dispersed preparatory to depositing in the mold.

15. The process of claims 6 or 10, further comprising the step of curing the magnetic coating on the supporting substrate by air drying.

16. A process for forming a flexible magnetic disk composite of magnetic oxide coating on a supporting substrate, comprising:

providing a mold having an etched surface pattern of predetermined nominal depth;

depositing a magnetic oxide coating material in the pattern;

removing the excess material from the mold surface to define the coating within the pattern;

contacting the coating with a discrete silicone transfer medium to temporarily adhere the defined coating to the medium;

transferring the coating from the medium to the substrate;

establishing a preferred magnetic actual orientation in the coating; and curing the coating.

17. The process of claims 6 or 10 wherein the substrate is flexible.

18. The process of claims 6 or 10 wherein the substrate is rigid.

19. The process of claims 6 or 10 wherein the mold nominal depth is approximately 700 microinches and the coating thickness is approximately 10 to 20 microinches.

20. The process of claims 6 or 10 wherein the steps of orienting and curing are performed simultaneously.

21. The process of claims 6 or 10 wherein the orienting is done prior to curing and provides one of longitudinal, perpendicular or annular orientation.

22. The process of claims 6 or 10 wherein the orienting step is performed statically or dynamically.

23. The process of claims 6 or 10 wherein the disk and magnetic field are rotated relative to one another with the path of rotation of the field being annular about to the disk.

24. The process of claims 6 or 10 wherein the preferred magnetic orientation is established by applying a magnetic field and wherein a source is provided for generating the magnetic field and wherein the source corresponds substantially in configuration and dimension to the major surface of the disk.

25. The process of claim 6 or 10 or 16 wherein the mold nominal depth is at least 100 microinches.

26. The process of claim 6 or 10 or 16 wherein the coating thickness is at least 10 microinches.

27. The process of claim 6 or 10 or 16 wherein the ratio of the mold nominal depth to coating thickness is approximately 10:1 to 20:1.

28. The process of claim 6 or 10 or 16 wherein the ratio of mold nominal depth to coating thickness is approximately 10:1 to 20:1 and the mold nominal depth is approximately 100 to 1200 microinches.

29. The process of claims 6 or 10 wherein the mold nominal depth is approximately 1200 microinches and the coating thickness is approximately 70 microinches.

30. The process of claims 6 or 10 wherein the mold nominal depth is approximately 700 microinches and the coating thickness is approximately 45 microinches.

* * * * *